(12) United States Patent
Tuttle

(10) Patent No.: US 8,115,637 B2
(45) Date of Patent: Feb. 14, 2012

(54) SYSTEMS AND METHODS TO SELECTIVELY CONNECT ANTENNAS TO RECEIVE AND BACKSCATTER RADIO FREQUENCY SIGNALS

(75) Inventor: John R. Tuttle, Boulder, CO (US)

(73) Assignee: Micron Technology, Inc., Boise, ID (US)

( * ) Notice: Subject to any disclaimer, the term of this patent is extended or adjusted under 35 U.S.C. 154(b) by 863 days.

(21) Appl. No.: 12/132,594

(22) Filed: Jun. 3, 2008

(65) Prior Publication Data

US 2011/0279232 A1    Nov. 17, 2011

(51) Int. Cl.
*G08B 13/14* (2006.01)
(52) U.S. Cl. .................. 340/572.7; 340/572.4
(58) Field of Classification Search .......... 340/572.1, 340/572.4, 572.5, 572.7, 539.1, 10.1, 10.3, 340/10.4; 343/725, 895; 473/351, 353; 455/41.1, 455/193.1, 271
See application file for complete search history.

(56) References Cited

U.S. PATENT DOCUMENTS

| | | |
|---|---|---|
| 2,256,619 A | 9/1941 | Luck |
| 3,721,990 A | 3/1973 | Gibson et al. |
| 3,727,230 A | 4/1973 | Doi |
| 3,859,652 A | 1/1975 | Hall et al. |
| 3,967,202 A | 6/1976 | Batz |
| 4,016,553 A | 4/1977 | Novikoff et al. |
| 4,075,632 A | 2/1978 | Baldwin et al. |
| 4,260,983 A | 4/1981 | Falck et al. |
| 4,274,083 A | 6/1981 | Tomoeda |
| 4,333,072 A | 6/1982 | Beigel |
| 4,510,495 A | 4/1985 | Sigrimis et al. |
| 4,525,713 A | 6/1985 | Barletta et al. |
| 4,539,660 A | 9/1985 | Miyauchi et al. |
| 4,554,554 A * | 11/1985 | Olesen et al. ................. 343/895 |
| 4,572,976 A | 2/1986 | Fockens |
| 4,596,988 A | 6/1986 | Wanka |
| 4,630,044 A | 12/1986 | Polzer |
| 4,641,374 A | 2/1987 | Oyama |
| 4,646,090 A | 2/1987 | Mawhinney |
| 4,651,157 A | 3/1987 | Gray et al. |
| 4,654,658 A | 3/1987 | Walton |
| 4,656,472 A | 4/1987 | Walton |

(Continued)

OTHER PUBLICATIONS

Transaction History of related U.S. Appl. No. 08/422,007, filed Apr. 11, 1995, entitled "Spherical Antenna Pattern(s) From Antenna(s) Arranged in a Two-Dimensional Plane for Use in RFID Tags and Labels," now U.S. Patent No. 5,572,226.

(Continued)

*Primary Examiner* — Van T. Trieu
(74) *Attorney, Agent, or Firm* — Greenberg Traurig, LLP

(57) ABSTRACT

Systems and methods to selectively attach and control antennas via diodes and current sources. In one embodiment, a system includes: an RFID reader having a plurality of reader antennas of different polarizations to transmit radio frequency signals; and at least one RFID tag. The RFID tag includes: a plurality of tag antennas of different polarizations; a plurality of diodes coupled to the plurality of tag antennas respectively; a receiver coupled to the plurality of diodes to receive the radio frequency signals from the tag antennas when the diodes are forward biased; and a set of one or more current controllers coupled to the plurality of diodes. In a receiving mode the controllers selectively forward bias the diodes to receive the signals from the RFID reader. In a transmitting mode the controllers selectively change the state of the tag antennas to transmit data via backscattering the radio frequency signals.

21 Claims, 5 Drawing Sheets

U.S. PATENT DOCUMENTS

| | | | |
|---|---|---|---|
| 4,724,427 A | 2/1988 | Carroll | |
| 4,730,188 A | 3/1988 | Milheiser | |
| 4,740,792 A | 4/1988 | Sagey et al. | |
| 4,782,342 A | 11/1988 | Walton | |
| RE32,856 E | 2/1989 | Millsap et al. | |
| 4,809,009 A | 2/1989 | Grimes et al. | |
| 4,819,053 A | 4/1989 | Halavais | |
| 4,822,990 A | 4/1989 | Tamada et al. | |
| 4,854,328 A | 8/1989 | Pollack | |
| 4,857,893 A | 8/1989 | Carroll | |
| 4,862,160 A | 8/1989 | Ekchian et al. | |
| 4,870,419 A | 9/1989 | Baldwin et al. | |
| 4,888,591 A | 12/1989 | Landt et al. | |
| 4,890,072 A | 12/1989 | Espe et al. | |
| 4,890,075 A | 12/1989 | Pohlmann et al. | |
| 4,904,983 A | 2/1990 | Mitchell | |
| 4,912,471 A | 3/1990 | Tyburski et al. | |
| 4,918,458 A | 4/1990 | Brenner et al. | |
| 4,920,450 A | 4/1990 | Masiulis | |
| 4,926,182 A | 5/1990 | Ohta et al. | |
| 4,937,581 A | 6/1990 | Baldwin et al. | |
| 5,046,130 A | 9/1991 | Hall et al. | |
| 5,051,726 A | 9/1991 | Copeland et al. | |
| 5,055,851 A | 10/1991 | Sheffer | |
| 5,084,699 A | 1/1992 | DeMichele | |
| 5,086,389 A | 2/1992 | Hassett et al. | |
| 5,103,235 A | 4/1992 | Clemens | |
| 5,126,749 A | 6/1992 | Kaltner | |
| 5,134,085 A | 7/1992 | Gilgen et al. | |
| 5,136,719 A | 8/1992 | Gaskill et al. | |
| 5,142,292 A | 8/1992 | Chang | |
| 5,144,314 A | 9/1992 | Malmberg et al. | |
| 5,164,985 A | 11/1992 | Nysen et al. | |
| 5,175,774 A | 12/1992 | Truax et al. | |
| 5,198,826 A | 3/1993 | Ito | |
| 5,272,367 A | 12/1993 | Dennison et al. | |
| 5,287,112 A | 2/1994 | Schuermann | |
| 5,300,875 A | 4/1994 | Tuttle | |
| 5,323,150 A | 6/1994 | Tuttle | |
| 5,334,974 A | 8/1994 | Simms et al. | |
| 5,365,551 A | 11/1994 | Snodgrass et al. | |
| 5,374,930 A | 12/1994 | Schuermann | |
| 5,406,263 A | 4/1995 | Tuttle | |
| 5,420,757 A | 5/1995 | Eberhardt et al. | |
| 5,446,447 A | 8/1995 | Carney et al. | |
| 5,448,110 A | 9/1995 | Tuttle et al. | |
| 5,448,242 A | 9/1995 | Sharpe et al. | |
| 5,461,385 A | 10/1995 | Armstrong | |
| 5,471,212 A | 11/1995 | Sharpe et al. | |
| 5,479,172 A | 12/1995 | Smith et al. | |
| 5,479,416 A | 12/1995 | Snodgrass et al. | |
| 5,489,546 A | 2/1996 | Ahmad et al. | |
| 5,500,650 A | 3/1996 | Snodgrass et al. | |
| 5,519,621 A | 5/1996 | Wortham | |
| 5,521,600 A | 5/1996 | McEwan | |
| 5,525,993 A | 6/1996 | Pobanz et al. | |
| 5,572,226 A | 11/1996 | Tuttle | |
| 5,621,412 A | 4/1997 | Sharpe et al. | |
| 5,649,296 A | 7/1997 | MacLellan et al. | |
| 5,656,978 A | 8/1997 | Bianu et al. | |
| 5,668,560 A | 9/1997 | Evans et al. | |
| 5,719,586 A | 2/1998 | Tuttle | |
| 5,894,266 A | 4/1999 | Wood | |
| 5,970,398 A | 10/1999 | Tuttle | |
| 6,122,494 A | 9/2000 | Tuttle | |
| 6,243,013 B1 | 6/2001 | Duan et al. | |
| 6,434,368 B1 | 8/2002 | Standmark | |
| 6,466,131 B1 | 10/2002 | Tuttle et al. | |
| 6,466,634 B1 | 10/2002 | O'Toole et al. | |
| 6,574,454 B1 | 6/2003 | Tuttle | |
| 7,209,080 B2 | 4/2007 | Crouch et al. | |
| 7,528,699 B2* | 5/2009 | Nagai | 340/10.4 |
| 7,766,766 B2* | 8/2010 | Savarese et al. | 473/351 |
| 7,804,455 B2* | 9/2010 | Lee et al. | 343/725 |
| 2003/0174099 A1 | 9/2003 | Bauer | |
| 2005/0083179 A1 | 4/2005 | Carrender et al. | |
| 2007/0152831 A1 | 7/2007 | Eisele | |
| 2008/0030305 A1* | 2/2008 | O'Connor | 340/10.1 |
| 2008/0266192 A1 | 10/2008 | Tuttle et al. | |
| 2009/0058649 A1 | 3/2009 | Tuttle | |

OTHER PUBLICATIONS

Transaction History of related U.S. Appl. No. 08/584,788, filed Jan. 1, 1996, entitled "Spherical Antenna Pattern(s) From Antenna(s) Arranged in a Two-Dimensional Plane for Use in RFID Tags and Labels," now U.S. Patent No. 5,719,586.

Transaction History of related U.S. Appl. No. 08/656,530, filed May 30, 1996, entitled "Method and Apparatus for Remote Monitoring," now U.S. Patent No. 5,894,266.

Transaction History of related U.S. Appl. No. 08/704,965, filed Aug. 29, 1996, entitled "Radio Frequency Antenna with Current Controlled Sensitivity," now U.S. Patent No. 5,970,398.

Transaction History of related U.S. Appl. No. 09/172,714, filed Oct. 13, 1998, entitled "Radio Frequency Antenna with Current Controlled Sensitivity," now U.S. Patent No. 6,122,494.

Transaction History of related U.S. Appl. No. 09/542,800, filed Apr. 4, 2000, entitled "Radio Frequency Antenna with Current Controlled Sensitivity," now U.S. Patent No. 6,574,454.

Transaction History of related U.S. Appl. No. 11/740,393, filed Apr. 26, 2007, entitled "Methods and Systems of Changing Antenna Polarization."

Transaction History of related U.S. Appl. No. 11/848,295, filed Aug. 31, 2007, entitled "Selectively Coupling to Feed Points of an Antenna System."

O'Toole, James E., U.S. Appl. No. 60/017,900, filed May 13, 1996.

Tuttle, Mark E., U.S. Appl. No. 60/023,321, filed Jul. 30, 1996.

Tuttle, John R., U.S. Appl. No. 11/740,393, filed Apr. 26, 2007.

Tuttle, John R., U.S. Appl. No. 11/848,295, filed Aug. 31, 2007.

Beebe, Paul, "High-Tech Rules Ada," The Idaho Statesman, Jul. 11, 1993, reprinted in "Micron Morning Report," Jul. 16, 1993.

Bernhard, J.T. et al., "A Commemoration of Deschamps' and Sichak's 'Microstrip Microwave Antennas:' 50 years of Development, Divergence, and New Directions," Proceedings of the 2003 Antenna Applications Symposium, pp. 189-230, Sep. 2003.

Johnson, Cameron et al., "Data Transmission via Polarization Modulation of a 2.4 Ghz Circularly Polarized Radio Wave", Students of Advanced Laboratory, Department of Physics, UMR, 2001.

Kranz, Eric et al., "GPS Antenna Design and Performance Advancements: The Trimble Sephyr", Trimble GPS Engineeering and Construction Group, Sunnyvale, California, Pete Large, Trimble Integrated Surveying Group, Westminster, Colorado, 2001.

Tuttle, John R., "A Low-Power Spread Spectrum CMOS RFID for Radio Identification Applications," Conference Proceedings of RF Expo West, pp. 216-222, Mar. 22, 1994.

Tuttle, John, "Digital RF/ID Enhances GPS," Proceedings of the Second Annual Wireless Symposium, pp. 406-411, Feb. 15, 1994.

Vittoz, Eric et al., "CMOS Analog Integrated Circuits Based on Weak Inversion Operation," IEEE Journal of Solid State Circuits, vol. SC-12, No. 3, pp. 224-231, Jun. 1997.

Mitsubishi Motors Corporation, "Eclipse: Safety and Security," located at http://www.mitsubishi-motors.co.jp.r/products/Eclipse/eclipse_04.html, 1995.

Transponder News, "Amtech Awarded $5.6 Million Contract to Install and Maintain Toll Collection System," located at http://www.pix.za/trolley/news.html, Feb. 29, 1996.

Transponder News, "Amtech to Install Hands-Free AEI System for Tracking Dillard's Mortor Freight Fleet," located at http://www.pix.za/trolley/news.html, Feb. 21, 1996.

Transponder News, "Tagmaster Finds Wide Spread Applications," located at http://www.pix.za/trolley/news.html, Feb. 1996.

Transponder News, "Texas Instruments and Remote Systems Applications Make Effective TAG Team Against Auto Theft," located at http://pix.za/trolley/news.html, Jan. 6, 1995.

USPTO Transaction History of U.S. Appl. No. 11/848,295, filed Aug. 31, 2007, entitled "Selectively Coupling to Feed Points of an Antenna System."

* cited by examiner

SYSTEMS AND METHODS TO SELECTIVELY CONNECT ANTENNAS TO RECEIVE AND BACKSCATTER RADIO FREQUENCY SIGNALS

FIELD OF THE TECHNOLOGY

At least some embodiments disclosed herein relate to coupling of antennas to a communication system, such as a radio frequency identification (RFID) system.

BACKGROUND

A typical radio frequency identification (RFID) tag has a memory configured to store data. The data stored in the tag memory typically includes data that uniquely identifies the tag among a plurality of RFID tags. An RFID reader can be used to communicate with the tag over a radio link. Thus, the identity of the tag and the object labeled by the tag can be determined by the RFID reader in an automated process.

In a typical RFID system, an RFID reader is configured to interrogate the tags via radio frequency electromagnetic waves. The RFID reader broadcasts commands using a beam of electromagnetic wave. In response to the interrogation signals from the reader, the RFID tag may be selected to produce a radio frequency response signal.

An RFID tag may be a passive tag, a semi-passive tag, or an active tag, depending on the power source of the RFID tag and the way a response signal is produced.

A passive tag does not have an internal battery or power source. A passive RFID tag operates using the power drawn from the interrogating electromagnetic wave. A passive tag provides the response through the modulation of backscattering of the interrogating electromagnetic wave.

A semi-active tag has an internal battery or power source. A semi-active RFID tag operates using the power drawn from the internal battery or power source. A semi-active provides the response through the modulation of the backscattering of the interrogating electromagnetic wave.

An active tag that has an internal battery or power source, using which a separate transmission signal is generated to provide the response. The response signal is generated independent from the interrogating electromagnetic wave.

Radio frequency identification (RFID) tags are used in a variety of applications, such as tagging vehicles on toll roads, tagging shipping containers, quality control on assembly line conveyor belts, and monitoring tactical military equipment maneuvers, etc.

There are various ways to configure and use antennas in a RFID system. For example, Tuttle disclosed in U.S. Pat. No. 5,572,226 an RFID system in which a plurality of antennas arranged in a two dimensional plane are combined to represent a nearly spherical antenna pattern in three dimensions. Tuttle disclosed in U.S. Pat. No. 6,574,454 an RFID system in which an antenna is coupled to a receiver via a Schottky diode. The disclosures of the above mentioned U.S. Patents by Tuttle are incorporated herein by reference.

SUMMARY OF THE DESCRIPTION

Systems and methods to selectively attach and control antennas via diodes and current sources are described herein. Some embodiments are summarized in this section.

In one embodiment, a system includes: an RFID reader having a plurality of reader antennas of different polarizations to transmit radio frequency signals; and at least one RFID tag. The RFID tag includes: a plurality of tag antennas of different polarizations; a plurality of diodes coupled to the plurality of tag antennas respectively; a receiver coupled to the plurality of diodes to receive the radio frequency signals from the tag antennas when the diodes are forward biased; and a set of one or more current controllers coupled to the plurality of diodes. In a receiving mode the controllers selectively forward bias the diodes to receive the signals from the RFID reader. In a transmitting mode the controllers selectively change the state of the tag antennas to transmit data via backscattering the radio frequency signals.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In at least one embodiment of the disclosure, an antenna of a radio frequency device is coupled to a receiver via a diode. When the diode is forward biased using a current source, the impedance of the diode for the antenna signal is reduced and thus allow the antenna signal to enter the receiver. When the diode is not forward biased, the impedance of the diode for the antenna signal is high and thus prevents the antenna signal from entering the receiver. Thus, the diode functions as a switch between the antenna and the receiver.

In one embodiment, the same current source that is used to selectively bias the diode is also used to change the state of antenna to modulate backscatter by the antenna. During a transmission mode, the impedance of the current source is controlled to change the state of the antenna for data transmission via backscattering.

Using the same current source for both antenna selection and data transmission can reduce cost and complexity, and improve system reliability, especially if the diode is placed near the feed point of the antenna.

Figure 1:
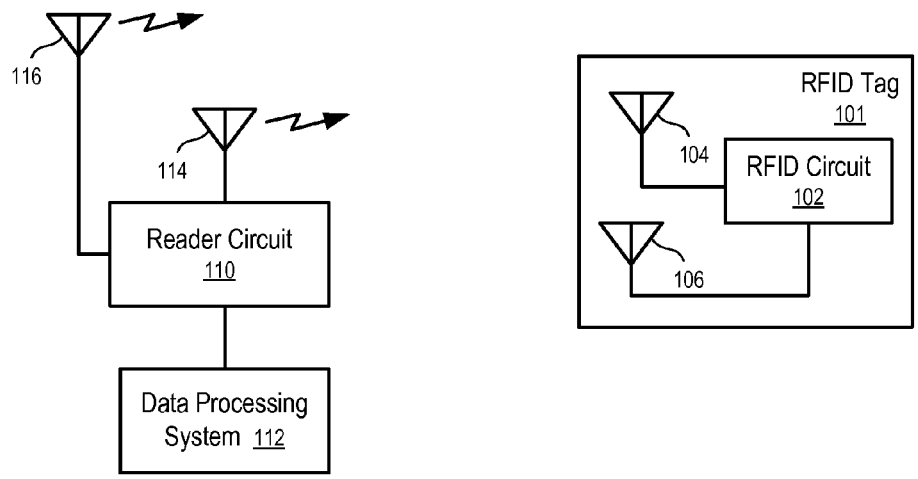
FIG. 1 shows a radio frequency identification system according to one embodiment.

FIG. 1 shows a radio frequency identification (RFID) system according to one embodiment. In FIG. 1, the system (100) includes a data processing system (112) coupled to an RFID reader circuit (110). The data processing system (112) may include a general purpose computer, or a special purpose computer, or a set of computers coupled to the reader circuit (112) via a data communication network, such as a local area network, Internet, etc. The reader circuit (110), or a combination of the reader circuit (110) and the data processing system (112), may also be referred to as an interrogator or reader.

In FIG. 1, the reader has a plurality of antennas (e.g., 114 and 116). In one embodiment, the plurality of antennas have different polarizations. The reader selectively couples its transmitter to one of the antennas to transmit signals via the selected antenna. Thus, the reader can transmit the signals in different combinations of polarizations.

In FIG. 1, the reader circuit (110) communicates with a representative RFID tag (101), which may be one of a plurality of RFID tags that are within the communication range of the RFID system. The reader circuit (110) provides a carrier signal to power the antenna (114) and/or the antenna (116) to send a beam of interrogating electromagnetic wave to the RFID tag. Commands to the RFID tags are modulated on the carrier signal.

The RFID tag (101) includes a plurality of tag antennas (e.g., 104, 106) to receive the interrogating electromagnetic wave. In one embodiment, the tag antennas (e.g., 104, 106) also have different polarizations. The RFID system uses signals of different polarizations to improve signal reception and/or to determine the orientation of the RFID tag. In another embodiment, the reader transmits using one antenna configured for one polarization; and the RFID tag is configured to have multiple antennas of different polarizations to achieve signal reception that is substantially independent from the orientation of the RFID tag.

In one embodiment, the RFID tag (101) includes an RFID circuit (e.g., 102) to process commands received from the RFID reader. Based on the commands, the RFID tag (101) can be selectively silenced (e.g., being placed in a mode to reduce interrogating electromagnetic wave backscattered from the tag, or not to actively transmit any signals using its internal power source), or be instructed to produce a response.

In one embodiment, the interrogation signal from the reader circuit (110) is received by the tag antenna (104 and/or 106) and passed to the RFID circuit (102) for processing. If the interrogation signal triggers a response, the RFID circuit (102) uses its tag antenna (104 and/or 106) to send to the reader circuit (19) a response, such as tag identification information or other data stored in the memory of the tag (101).

The reader circuit (110) passes the data obtained from the RFID tags to the data processing system (112), which performs any suitable function. For example, based on the data received from the RFID tag (101), the data processing system (112) may allow access to a building or parking garage, note the entrance of an employee to a work location, direct a parcel identified by the RFID tag down a particular conveyor system, or conduct inventory of products in a shopping cart for purposes of checkout and payment.

In one embodiment, the tag antennas (104 and 106) are coupled to the RFID circuit (102) via diodes. Current sources used to bias the diodes are also used to change the backscatter state of the antennas (104 and 106) for transmission of data via backscattering the interrogating signals transmitted from the reader antennas (114 and/or 116).

Figure 2:
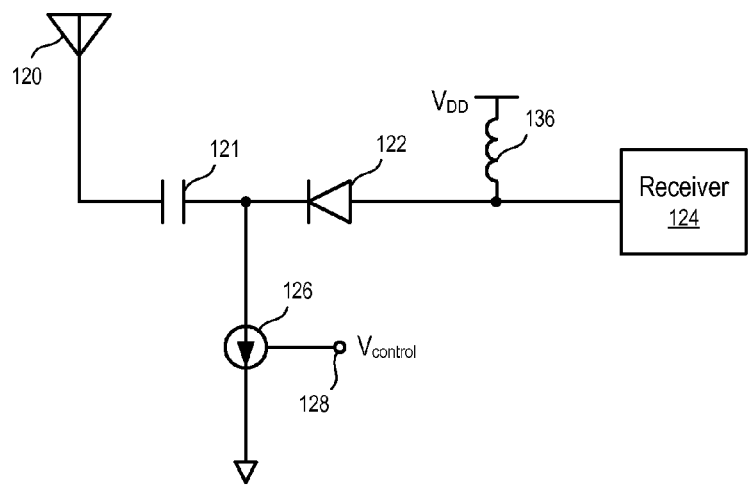
FIG. 2 shows an antenna connection system according to one embodiment.

FIG. 2 shows an antenna connection system according to one embodiment. In FIG. 2, the antenna (120) is coupled to the receiver (124) via a capacitor (121) and a diode (122). When the diode (122) is forward biased, the impedance of the diode (122) for the Alternating Current (AC) signal from the antenna (120) is reduced, providing a path to allow the signals received at the antenna (120) to enter the receiver (124). When the diode (122) is not forward biased (or reverse biased), the impedance of the diode (122) is high to prevent the antenna signal from entering the receiver (124). Inductor (136) provides a DC current path when the current source (126) is ON, while presenting a high impedance to the AC signal from the antenna; and the capacitor (121) blocks the DC current from entering the antenna (120).

In FIG. 2, a controllable current path, such as the controllable current source (126), is coupled between the diode (122) and the ground to selectively bias the diode (122) based on the voltage applied at the control point (128). For example, when a first control voltage is applied to the control point (128), the diode (122) is forward biased via a Direct Current (DC) provided by the current source (126); when a second voltage is applied to the control point (128), the DC bias current supplied by the current source to the diode (122) is reduced or stopped. Thus, the current source (126) can be selectively controlled to couple the AC signals from the antenna (120) to the receiver (124) or to isolate the antenna signals from the receiver (124).

In FIG. 2, the impedance of the current source (126) is also adjustable by the voltage applied at the control point (128). When the impedance of the current source is high, the antenna (120) is in a reflective state; when the impedance of the current source is low, the antenna (120) is in an absorptive state. Thus, changing the impedance of the current source via the control voltage can also be used to modulate the interrogation signal backscattered by the tag antenna (120). The backscattered interrogation signal can be modulated to transmit data. A reader system can send an interrogating electromagnetic wave and determine the tag transmitted data from the amplitude modulated wave backscattered from the tag antenna.

Figure 3:
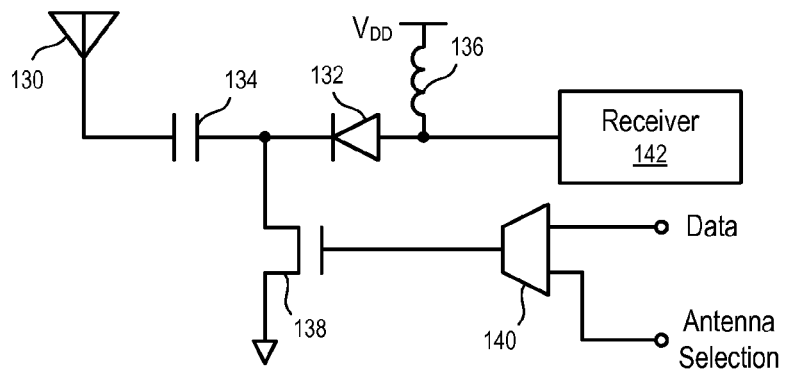
FIG. 3 illustrates an example to connect an antenna according to one embodiment.

In one embodiment, the current source (126) is implemented using a transistor, as illustrated in FIG. 3. In FIG. 3, the antenna (130) is coupled to the receiver (142) via a capacitor (134) and a diode (132). An inductive element (136), a capacitive element (134) and a transistor (138) are used to selectively bias the diode (132). The gate of the transistor (138) can be used to control the bias current and be used to turn the transistor on and off for modulating the backscatter by the tag antenna (130) for data transmission.

In FIG. 3, when the system is in a receiving mode, the multiplexer (140) selects the antenna selection signal, which causes the transistor (138) to selectively provide a forward bias current to the diode (132). For example, when the antenna selection is at a first voltage, the diode is forward biased to switch on the connection between the antenna (130) and the receiver (142); when the antenna selection is at a second voltage, the diode is not sufficiently forward biased and thus switches off the connection between the antenna (130) and the receiver (142). When the diode (132) is forward biased, the antenna signal is provided to the receiver (142).

When the diode (132) is not forward biased, the antenna signal is not provided from the antenna (130) to the receiver (142).

In one embodiment, when the antenna signal is not provided from the antenna to the receiver (142), the energy from the antenna is redirected to charge a battery cell of the system.

In one embodiment, when the system is in a transmitting mode, the data signal provided to the multiplexer (140) changes between a third voltage and a forth voltage, which may be the same as or different from the first and second voltages of the antenna selection signal that is used to control the bias current of the diode (132). When the third voltage is applied to the gate of the transistor (138), the impedance between the source and drain of the transistor (138) is low (e.g., the transistor is switched on); and thus, the antenna (130) is in an abortive state and the signal backscattered from the antenna (130) has a low amplitude. When the forth voltage is applied to the gate of the transistor (138), the impedance between the source and drain of the transistor (138) is high (e.g., the transistor is switched off); and thus, the antenna (130) is in a reflective state and the signal backscattered from the antenna (130) has a high amplitude.

Thus, the same transistor (138) is used for antenna selection in a receiving mode and used for data transmission in a transmitting mode.

Although FIG. 3 illustrates an example to use a multiplexer to combine the antenna selection signal and the data signal to generate the control voltage for the gate of the transistor, other types of logic circuit or analog circuit can also be used to generate the control signal for the gate of the transistor.

Figure 4:
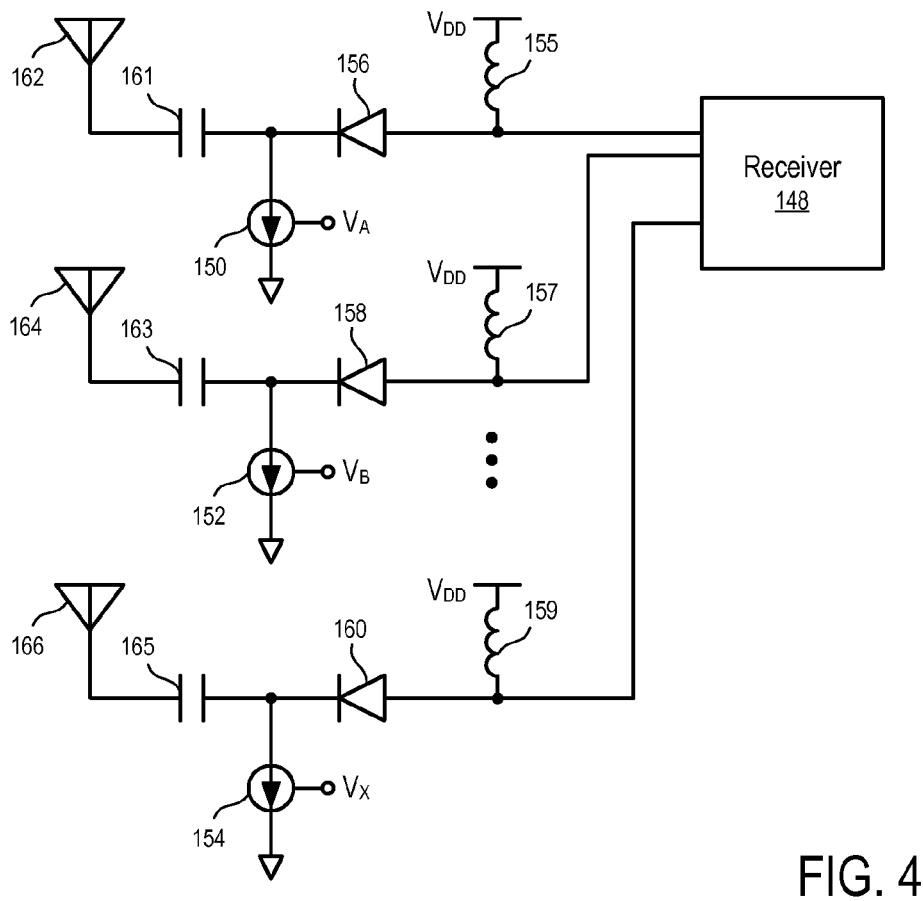
FIG. 4 illustrates an example to selectively use a set of antennas according to one embodiment.

FIG. 4 illustrates an example to selectively use a set of antennas according to one embodiment. In one embodiment, a RFID tag has a plurality of antennas (162, 164, ..., 166), which are coupled to the receiver (148) through the DC blocking capacitors (161, 163, ..., 165) and the diodes (156, 158, ..., 160) respectively. The RFID tag includes at least a memory (not shown in FIG. 4) coupled to a receiver. The memory stores identification data of the RFID device. After receiving a request or command using the receiver, the identification data is transmitted via signals backscattered by one or more of the antennas (162, 164, ..., 166).

The antenna connection system can also be used in other types of radio frequency devices, which may not have a memory to identify the device. For example, the radio frequency device may be used to collect and report information, such as temperature, etc.

In FIG. 4, the inductors (155, 157, ..., 159), the capacitors (161, 163, ..., 165) and the controllable current sources (150, 152, ..., 154) are used to selectively forward bias the corresponding diodes (156, 158, ..., 160) in the receiving mode. In one embodiment, the control voltages ($V_A$, $V_B$, ..., $V_X$) for the current sources (150, 152, ..., 154) are generated and applied by the radio frequency device (e.g., an RFID tag).

For example, the antennas (162, 164, ..., 166) can be configured to have different polarizations and selectively used to optimize signal reception. For example, the antennas (162, 164, ..., 166) can be used in parallel or sequentially to achieve a nearly spherical antenna pattern in three dimensions, while the antennas (162, 164, ..., 166) are arranged in a two dimensional plane (e.g., as a patch antenna system). For example, the polarizations of the antennas can be aligned with certain axes of an object to which the RFID tag is attached; and through interrogating the RFID using signals of different polarization, the orientation of the object can be determined or estimated.

In FIG. 4, one or more of the controllable current sources (150, 152, ..., 154) are used to selectively modulate the backscatter by the corresponding antennas according to the data to be transmitted. The impedance of the controllable current sources (150, 152, ..., 154) can be changed to selectively ground the corresponding antennas to transmit the data. The data can be transmitted by alternating the antennas between a state of absorption and a state of reflection to represent the bit values of the transmitted data.

Figure 5:
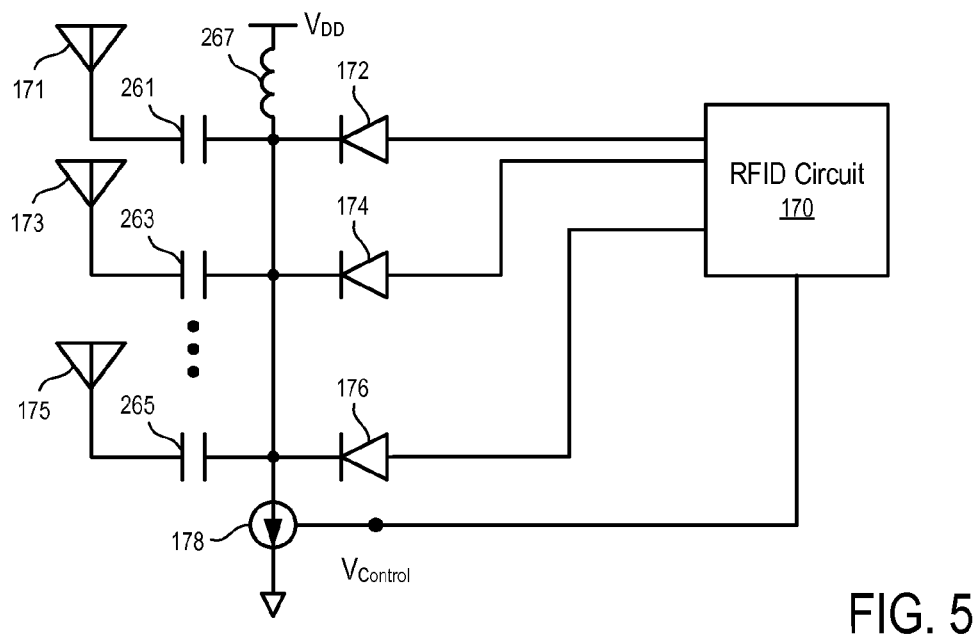
FIG. 5 illustrates an example to connect a plurality of antennas in parallel according to one embodiment.

FIG. 5 illustrates an example to connect a plurality of antennas in parallel according to one embodiment. In FIG. 5, a single current source (178) is used to control the antennas (171, 173, ..., 175) in parallel. An inductor (267), DC blocking capacitors (261, 263, ..., 265) and a current source (178) selectively bias the diodes (172, 174, ..., 176) in parallel.

In the receiving mode, the current source (178) can be controlled by the RFID circuit (170) to forward bias the diodes (172, 174, ..., 176) to connect the antenna signals to the RFID circuit (170), or to stop the forward DC bias current for the diodes (172, 174, ..., 176) to disconnect the antenna signals from the receiver of the RFID circuit (170).

In the transmitting mode, the current source (178) is controlled to selectively ground the antennas (171, 173, ..., 175) to modulate backscattering of the interrogation signals.

In one embodiment, the RFID device has one or more chargeable battery cells. When the diodes (172, 174, ..., 176) are not forward biased to receive signals, the antennas are used to trickle charge of the battery cells.

Figure 6:
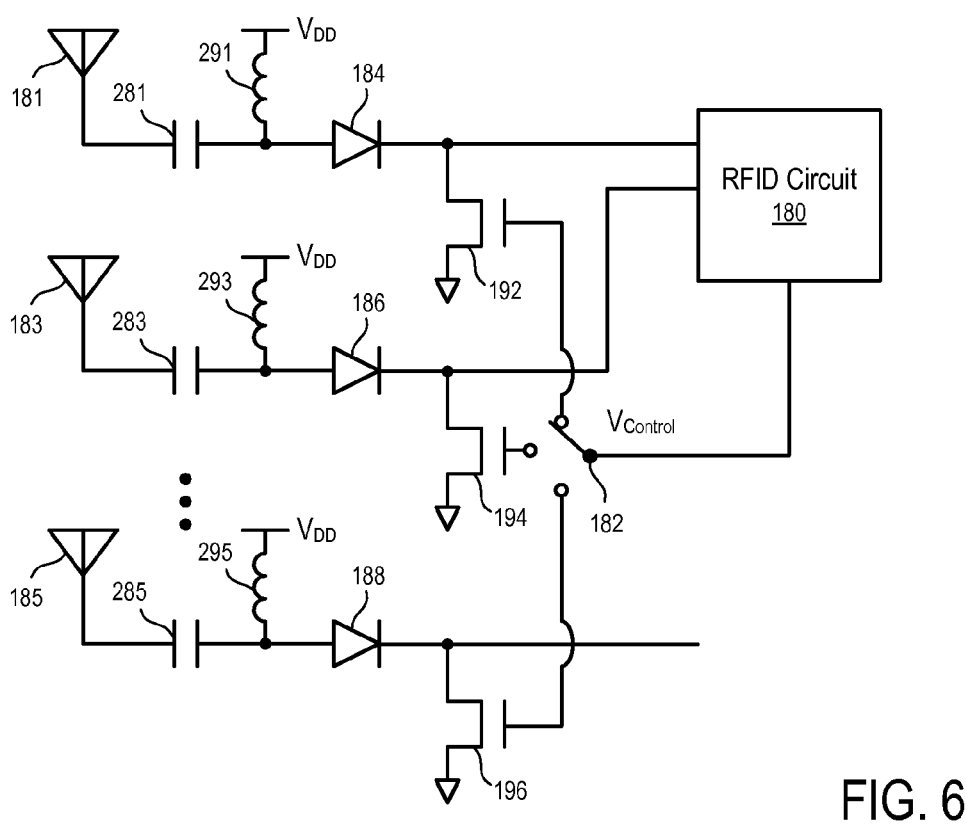
FIG. 6 illustrates an example to connect a plurality of antennas one at a time according to one embodiment.

FIG. 6 illustrates an example to connect a plurality of antennas one at a time according to one embodiment. In FIG. 6, the controller (182) connects the control signal to the gates of the transistors (192, 194, ..., 196) one at a time. The transistors (192, 194, ..., 196) are connected to the antenna diodes (184, 186, ..., 188) respectively to control the use of the corresponding antennas (181, 183, ..., 185).

In one embodiment, when the gate of a transistor (e.g., 194 or 196) is not connected to the control signal $V_{control}$, the transistor (e.g., 194 or 196), the corresponding inductor (e.g., 293 or 295) and DC blocking capacitor (e.g., 283 or 285) do not forward bias the corresponding diode (e.g., 186 or 188); and the signal from the corresponding antenna (e.g., 183) is isolated from the receiver of the RFID circuit (180). When the gate of a transistor (e.g., 192) is connected to the control signal $V_{control}$, the transistor (e.g., 192), the corresponding inductor (e.g., 291) and DC blocking capacitor (e.g., 281) forward bias the corresponding diode (e.g., 184) during the receiving mode; and the gate of the transistor (e.g., 192) is selectively turned on or off to module antenna backscattering for data transmission.

In another embodiment, when the gate of the transistor (e.g., 196) is not connected to the control signal $V_{control}$, the transistor (e.g., 196) is turned off to stop the forward bias current for the corresponding diode (e.g., 188) in the receiving mode, and turned on to ground the corresponding antenna (e.g., 185) to reduce backscattering by the corresponding antenna (e.g., 181).

Figure 7:
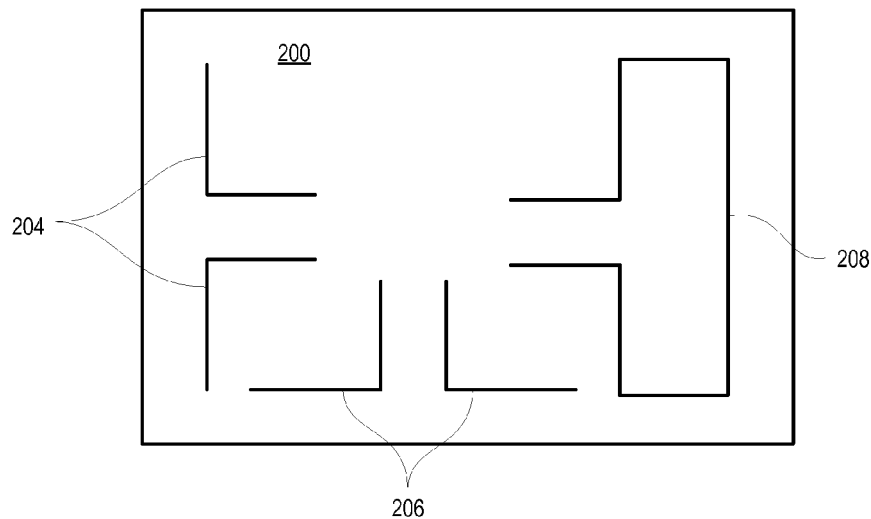
FIG. 7 shows an example to arrange multiple antennas for connection according to one embodiment.

FIG. 7 shows an example to arrange multiple antennas for connection according to one embodiment. In FIG. 7, the antenna system (200) includes dipole antennas (204 and 206) and a loop antenna (208). The dipole antennas are arranged to be perpendicular to each other, or approximately perpendicular to each other. The loop antenna is arranged to have at least an axis perpendicular to at least one of the dipole antennas (204 and 206). Alternatively, a circular loop antenna can be used.

Since a radio frequency voltage will produce a toroidal shaped electromagnetic field centered about a dipole antenna, the antenna configuration illustrated in FIG. 7 will effectively achieve a nearly spherical electromagnetic filed pattern when combined by switching them one at a time. When the combined coverage is approximately spherical, the signal transmission and/or reception are substantially independent from the orientation of the RFID device.

Although FIG. 7 illustrates a particular combination of dipole antennas (204 and 206) and a loop antenna (208), other combination of two dimensional antennas arranged on a plane can also be used. Further details in using a set of two dimensional antennas to obtain a nearly spherical antenna pattern in three dimensions can be found in U.S. Pat. No. 5,572,226, the disclosure of which is incorporated herein by reference.

In one embodiment, an antenna system having antennas with different polarizations as illustrated in FIG. 7 are connected to and controlled by an RFID device via diodes and one or more controllable current paths. The current paths can be controlled to selectively forward bias the diodes for antenna selection and to selectively ground the antennas for modulating signals backscattered by the antennas.

Figure 8:
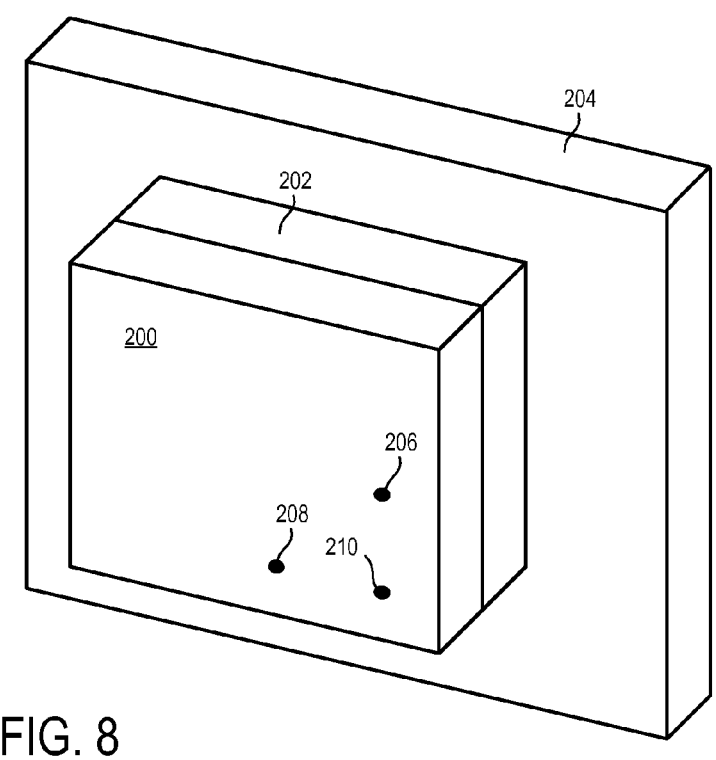
FIG. 8 illustrates an example to selectively connect an RFID circuit to feed points of a patch antenna system according to one embodiment.

FIG. 8 illustrates an example to selectively connect an RFID circuit to feed points of a patch antenna system according to one embodiment. In FIG. 8, the patch antenna system includes a ground plane or ground element (204) and a conductive patch (200) (e.g., copper, aluminum, etc.), separated by a dielectric layer (202) (e.g., air, silicon, plastic, etc.). The patch antenna system is arranged generally on a planar surface.

In FIG. 8, the conductive patch (200) defines a plurality of antennas and includes a plurality of feed points (e.g., 208, 206, and 210) of the antennas. The feed points may be located in the interior of the conductive patch, or on the periphery of the patch. Using different feed points alone or in combination can optimize the antenna reception for electromagnetic wave of different polarizations.

In one embodiment, the diodes and/or the corresponding controllable current paths are arranged at the vicinity of the corresponding feed points. For example, the diodes can be implemented using discrete elements and placed near the feed points. For example, the patch antenna can be formed on or attached to a printed circuit board; and the diodes can be mounted to the printed circuit board near the feed points in the plane of the printed circuit board.

Alternatively, the diodes and the corresponding controllable current paths can be integrated on a same semiconductor substrate (e.g., silicon) as the RFID circuit.

Figure 9:
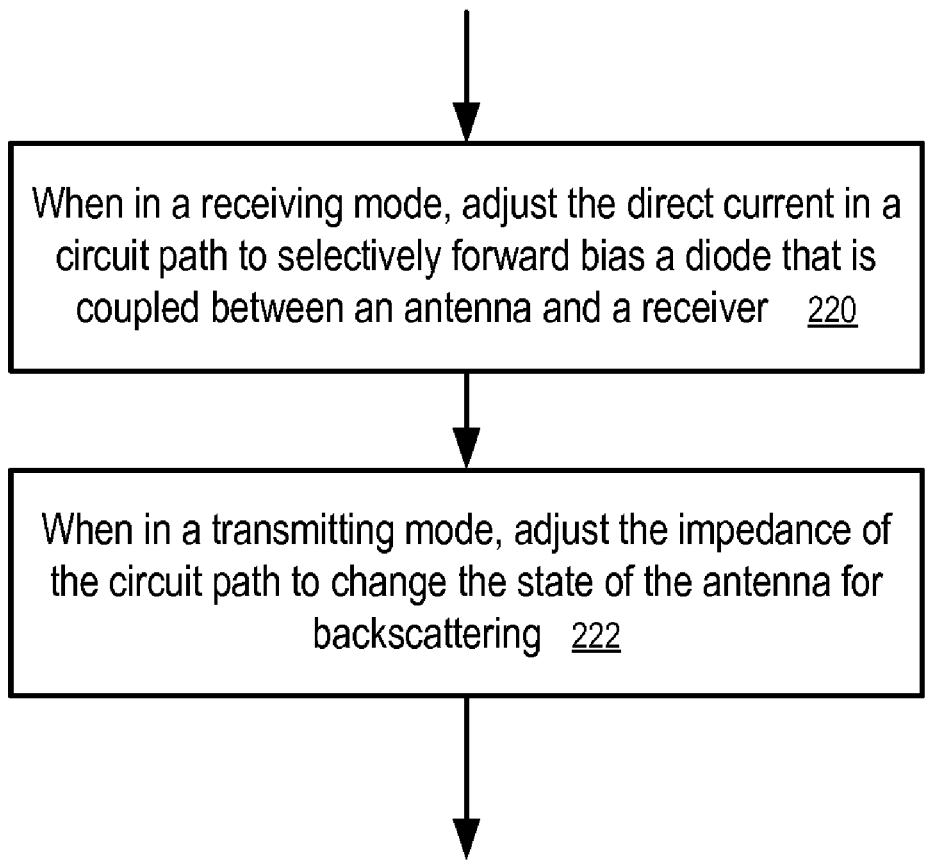
FIG. 9 illustrates a method implemented in a radio frequency device according to one embodiment.

FIG. 9 illustrates a method implemented in a radio frequency device according to one embodiment. In FIG. 9, when the device is in a receiving mode, the direct current in a circuit path is adjusted (220) to selectively forward bias a diode that is coupled between an antenna and a receiver. For example, the control voltage of a current source is adjusted to change the current in the circuit path of the current source to adjust the DC bias current and/or voltage in the diode. In one embodiment, the current source is a provided via a transistor. The gate of the transistor is used to control the current in the circuit path between the source and drain of the transistor.

When the device is in a transmitting mode, the impedance of the circuit path is adjusted to change the state of the antenna for backscattering. For example, the impedance in the circuit path between the source and drain of the transistor can be controlled to selectively place the antenna in an absorptive mode or in a reflective mode and thus modulate the signals backscattered by the antenna. Modulation of the backscattered signal is used to indicate the transmitted data.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A radio frequency identification (RFID) system, comprising:
   an RFID reader having a plurality of reader antennas of different polarizations to transmit radio frequency signals; and
   at least one RFID tag, the RFID tag comprising
      a plurality of tag antennas of different polarizations,
      a plurality of diodes coupled to the plurality of tag antennas respectively,
      a receiver coupled to the plurality of diodes to receive the radio frequency signals from the tag antennas when the diodes are forward biased, and
      a set of one or more current controllers coupled to the plurality of diodes, in a receiving mode the set of current controllers to forward bias at least one of the diodes to receive signals from the RFID reader, in a transmitting mode the set of current controllers to change a backscatter state of at least one of the tag antennas to transmit data via backscattering the radio frequency signals.

2. The system of claim 1, wherein the set of current controllers comprises a plurality of transistors coupled between the plurality of diodes and ground; when in the transmitting mode a gate of the transistors is controlled according to data being transmitted to modulate the radio frequency signals backscattered by at least one of the antennas; when in the receiving mode, the gate is applied a voltage to forward bias at least one of the diodes.

3. The system of claim 1, wherein the RFID tag further includes a controller to sequentially connect the tag antennas to a control voltage.

4. The system of claim 1, wherein the set of current controllers comprises a transistor coupled between the plurality of diodes and ground; when in the transmitting mode a gate of the transistor is controlled according to data being transmitted to modulate backscattering by the antennas in parallel; when in the receiving mode, the gate is applied a voltage to forward bias the diodes in parallel.

5. The system of claim 1, wherein the plurality of diodes are mounted in vicinity of respective feed points to which the diodes are connected.

6. The system of claim 1, wherein the receiver, the diodes, and the set of controllers are integrated on a single semiconductor substrate.

7. A radio frequency identification (RFID) tag, comprising:
   a receiver;
   a plurality of antennas;
   a plurality of diodes coupled between the plurality of antennas and the receiver, the diodes to provide signal paths between the antennas and the receiver when the diodes are forward biased; and
   a plurality of current controllers coupled to the plurality of diodes respectively, the current controllers controllable to selectively forward bias the diodes and to selectively ground the antennas to modulate backscatter by the antennas.

8. The RFID tag of claim 7, wherein the plurality of current controllers comprise a plurality of transistors; wherein gates of the transistors are controllable to selectively forward bias the diodes and to selectively ground the antennas to modulate backscatter by the antennas.

9. The RFID tag of claim 7, wherein the plurality of antennas have different polarization.

10. The RFID tag of claim 9, wherein the plurality of antennas comprise:
    a conductive patch having a plurality of feed points;
    a ground element; and
    a dielectric layer coupled between the conductive path and the ground element;
    wherein the diodes are coupled to the feed points.

11. The RFID tag of claim 10, wherein the diodes are placed in vicinity of the feed points to which the diodes are connected.

12. A radio frequency identification (RFID) tag, comprising:
    a receiver;
    a plurality of antennas;
    a plurality of diodes coupled between the plurality of antennas and the receiver; and
    a transistor coupled to the plurality of diodes, when in a receiving mode the transistor to provide a current to forward bias the diodes, when forward biased the diodes to provide signals from the antennas to the receiver, when in a transmitting mode the transistor to selectively ground the antennas to modulate backscatter by the antennas.

13. The RFID tag of claim 12, wherein the plurality of antennas are formed on a planar surface to create a spherical electromagnetic antenna pattern.

14. The RFID tag of claim 12, wherein the plurality of antennas includes two dipole antennas orthogonally formed on the planar surface and a loop antenna formed on the planar surface.

15. A radio frequency device, comprising:
    an antenna;
    a receiver;
    a diode coupled between the antenna and the receiver, when forward biased the diode to provide radio frequency signals received at the antenna to the receiver; and
    a controllable circuit path coupled to the diode, the circuit path to selectively provide a forward bias current to the diode, the circuit path to change a state of the antenna to transmit data via modulating backscatter by the antenna.

16. The device of claim 15, wherein the circuit path comprises a current controller to selectively provide the forward bias current and to change the state of the antenna.

17. The device of claim 16, wherein the current controller comprises a transistor coupled between the diode and ground; when the transistor is biased at a first voltage, the transistor provides the forward bias current to the diode; when the transistor is biased at a second voltage, the transistor stops the forward bias current; wherein the transistor is adjustable to change an impedance between the antenna and the ground to change the state of the antenna for backscattering when the transistor is biased according to data being transmitted.

18. The device of claim 17, wherein to change the state of the antenna to modulate backscattering, the transistor alternates between connecting the antenna to the ground and disconnecting the antenna from the ground.

19. The device of claim 15, further comprising:
an antenna system including the antenna, the antenna system having a plurality of feed points for the receiver;
wherein the diode is coupled to one of the plurality of feed points to the receiver.

20. A method implemented in a radio frequency identification system, the method comprising:
applying a first voltage to a control point of an electronic current path to forward bias a diode coupled between an antenna and a receiver, wherein when forward biased an impedance of the diode for signals propagating from the antenna to the receiver is reduced; and
applying a voltage to the control point according to data to be transmitted via the antenna to change an impedance of the current path to modulate backscattering of electromagnetic waves backscattered by the antenna.

21. The method of claim 20, wherein the electronic current path comprises a path between a source and a drain of a transistor; and the control point comprises a gate of the transistor.

* * * * *